(12) United States Patent
Philips

(10) Patent No.: US 6,223,527 B1
(45) Date of Patent: May 1, 2001

(54) MOTOR VEHICLE WITH INTERNAL COMBUSTION ENGINE AND CATALYTIC CONVERTER

(75) Inventor: Patrick Philips, Cologne (DE)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/485,479

(22) PCT Filed: Jul. 1, 1999

(86) PCT No.: PCT/EP99/04553

§ 371 Date: Feb. 10, 2000

§ 102(e) Date: Feb. 10, 2000

(87) PCT Pub. No.: WO00/01932

PCT Pub. Date: Jan. 13, 2000

(30) Foreign Application Priority Data

Jul. 2, 1998 (EP) .................................................. 98112219

(51) Int. Cl.[7] ...................................................... F01N 3/00
(52) U.S. Cl. ................................ 60/288; 60/287; 60/289; 60/292; 60/324; 60/323
(58) Field of Search .............................. 60/287, 288, 289, 60/292, 284, 323, 324, 322, 305

(56) References Cited

U.S. PATENT DOCUMENTS

| | | | |
|---|---|---|---|
| 3,545,414 | * 12/1970 | Thompson | 60/29 |
| 5,832,721 | * 11/1998 | Cullen | 60/274 |
| 5,855,113 | * 1/1999 | Cullen et al. | 60/274 |
| 5,937,637 | * 8/1999 | Fujishita et al. | 60/274 |
| 5,937,640 | * 8/1999 | Krzykowski et al. | 60/284 |
| 6,003,310 | * 12/1999 | Maysr et al. | 60/287 |

* cited by examiner

*Primary Examiner*—Thomas Denion
*Assistant Examiner*—Binh Tran
(74) *Attorney, Agent, or Firm*—Jerome R. Drouillard

(57) ABSTRACT

In the case of an internal combustion engine (1) arranged transversely in a motor vehicle and having in-line cylinders, the exhaust gases are passed forwards in the direction of travel around the internal combustion engine from that side of the latter which is opposite to the direction of travel and, from there, pass to a catalytic converter (8) arranged in the rear area of the motor vehicle. To ensure rapid heating of the catalytic converter when cold-starting, the exhaust manifold (2) of the internal combustion engine is connected to the inlet of the catalytic converter (8) by a short feed line (5) with a small cross section. An exhaust-gas recirculation line (15) which opens into line (4) close to the catalytic converter is provided.

5 Claims, 1 Drawing Sheet

Direction of travel

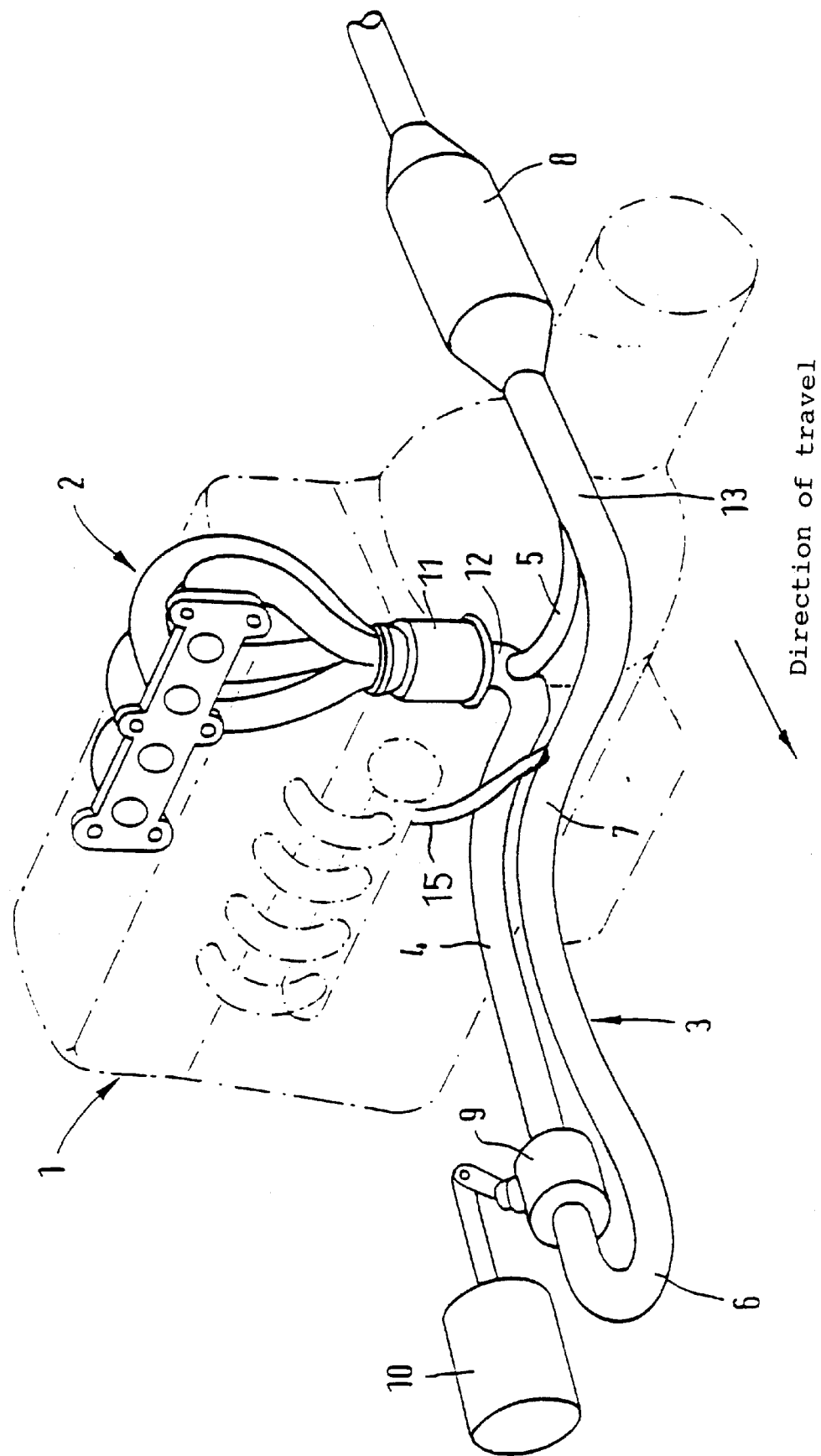

MOTOR VEHICLE WITH INTERNAL COMBUSTION ENGINE AND CATALYTIC CONVERTER

BACKGROUND OF THE INVENTION

The invention relates to a motor vehicle with an internal combustion engine, in which the exhaust gases are passed via a catalytic converter, the exhaust lines from the individual cylinders being combined into a collecting line, from which two feed lines, in particular two feed lines with different cross sections lead to the catalytic converter. The distance between one of the feed lines and the catalytic converter is greater and this feed line can be shut off by means of a valve.

SUMMARY OF THE INVENTION

An arrangement of a similar kind is disclosed in DE-A 42 18 834. Here, the arrangement, with an in-line engine arranged transversely in a motor vehicle, is such that two lines of equal length but different cross sections are passed from the internal combustion engine directly to the catalytic converter, which is arranged in the rear area of the motor vehicle. A shut-off valve is provided in the line with the larger cross section, and the line with the larger cross section is thus shut off in the warm-up phase and the exhaust gases are fed to the catalytic converter only through the line with the smaller cross section.

In DE-A 25 34 39 998, provision is made, where there are two different lines for feeding the exhaust gases to the catalytic converter, for making the feed lines of different lengths.

During lean combustion, the relatively high temperature in the reaction zone leads to increased levels of $NO_x$. The splitting of $N_2$ and hence the formation of $NO_x$ increases exponentially with temperature. The combustion temperature and hence the proportion of $NO_x$ can also be reduced by exhaust gas recirculation in the case of direct injection of gasoline.

It was an object of the invention, on the one hand, to ensure rapid heating of the catalytic converter after starting of the internal combustion engine without loss of the necessary cooling for feeding the exhaust gases to the catalytic converter during continuous operation of the motor vehicle. On the other hand, the intention is to further reduce the proportion of $NO_x$ in the case of gasoline internal combustion engines which employ the lean combustion method, by means of a structural modification of the exhaust-gas recirculation system.

This object is achieved by the fact that the lines for feeding the exhaust gases to the catalytic converter are of different lengths, the longer feed line having an arc-shaped region and then running counter to the direction of travel to the catalytic converter, which is arranged underneath the passenger compartment, the other feed line providing a short connection between a region of the collecting line and an exhaust-line region adjacent to the catalytic converter, and at least one exhaust-gas recirculation line branching off from the longer feed line.

This arrangement ensures that a positive solution can be offered for the "package" within the motor vehicle for the exhaust line and the catalytic converter; the longer feed line is situated in an area of the motor vehicle in which optimum cooling is possible. Nevertheless, by shutting off the feed line of larger cross section when starting the motor vehicle, the other feed line will ensure rapid heating of the catalytic converter. Taking the exhaust gas from a point on the longer feed line ensures that the exhaust gas removed is at a reduced temperature in all operating modes. This "cooled" exhaust gas can be used to further reduce the combustion temperature. Moreover, reduced temperature results in a higher exhaust gas recirculation rate, a reduction in consumption and higher efficiency.

As a development of the invention, the internal combustion engine can be arranged with the in-line cylinders transverse to the direction of travel and the exhaust manifold from the cylinders can be located behind the internal combustion engine, as seen in the direction of travel. This results in particularly favorable space conditions and the routing of the exhaust lines is simplified.

As a development of the invention, the valve for shutting off the longer connecting line can be arranged in the region of the bend in the exhaust line, ahead of the internal combustion engine as seen in the direction of travel; this opens up additional possibilities for cooling in this arrangement, something which is important for correct operation. In this case, the removal point for the exhaust gas to be recirculated is arranged between the valve and the catalytic converter.

It is also advantageous to arrange this valve ahead of or after the bend, as seen in the direction of flow of the exhaust gases, depending on where the possibilities for cooling are better.

A proportional valve is preferably arranged in the exhaust-gas recirculation line.

BRIEF DESCRIPTION OF THE DRAWING

An embodiment example of the invention is explained with reference to the FIGURE, which comprises a perspective view of the arrangement according to the invention with an internal combustion engine, the exhaust lines from the internal combustion engine to the catalytic converter, and the exhaust-gas recirculation line.

DETAILED DESCRIPTION OF THE INVENTION

An internal combustion engine 1 has in-line cylinders; in the embodiment example, the row of cylinders is arranged transversely to the direction of travel, as illustrated in the FIGURES. The exhaust gases from the internal combustion engine are fed via an exhaust manifold 2 to a decoupling element 11. From there, the exhaust gases are fed via an exhaust line, designated overall by 3, to a catalytic converter 8. This catalytic converter can also contain a device for reducing the $NO_x$ components of the exhaust gases when the internal combustion engine is operating in lean mode.

Just after the decoupling element 11 there is a facility for feeding the exhaust gases both to a feed line 4 with a greater, length and to a feed line 5, which feeds the exhaust gases to a region 13 of the exhaust line along a short route. In this arrangement, feed line 5 takes the exhaust gases from feed line 4 in a region 12. Region 13 is preferably situated in the exhaust line 7 just before the point where the latter enters the catalytic converter 8. The feed line 4 of larger cross section then runs in the direction of travel to an arc-shaped region 6, which is arranged below the internal combustion engine 1, and ahead of the internal combustion engine 1 in the direction of travel. The exhaust gases are then passed through an exhaust line 7 which runs counter to the direction of travel and feeds the exhaust gases to the catalytic converter 8.

Provided ahead of the arc-shaped region 6 of exhaust line 3 is a shut-off valve 9, which is situated between feed line 4 and the arc-shaped region 6. The shut-off valve 9 is actuated by an actuating device 10. The shut-off valve can also be arranged after the arc-shaped region 6, especially if cooling conditions are better there.

The exhaust-gas recirculation line 15 is connected between the decoupling device 11 and the catalytic converter 8. The exhaust-gas recirculation line 15 preferably opens close to region 13. It contains a shut-off valve (not shown in the drawing), which is preferably designed as a proportional valve.

When the internal combustion engine 1 is started, the actuating device 10 for the shut-off valve 9 ensures first of all that feed line 4 is closed. As a result, the exhaust gases pass to the catalytic converter 8 along a short route, via feed line 5, and here ensure rapid heating of the converter. Owing to the reduced pressure in the exhaust-gas recirculation line 15, relatively cool exhaust gas is drawn in via section 13 and feed line 5. Depending on the temperature in the catalytic converter, the shut-off valve 9 is then opened by means of the actuating device 10, thereby opening up the route for the exhaust gases via feed line 4, the arc-shaped region 6 and the exhaust line 7. Since feed line 4 has a larger cross section than feed line 5, by far the greater part of the exhaust gases passes via feed line 4 and the arc-shaped region 6 to the catalytic converter. In this operating mode too, the reduced pressure in the exhaust-gas recirculation line 15 causes relatively cool exhaust gas to be drawn in, although in this case via the bend 6.

What is claimed is:

1. An exhaust system for motor vehicles with an internal combustion engine, in which the exhaust gases are passed to the rear area of the motor vehicle via a catalytic converter, exhaust lines from the individual cylinders being combined on one side of the internal combustion engine into a collecting line, from which two feed lines of different lengths lead to the catalytic converter, and flow through the longer feed line is controlled by means of a valve, wherein at least one exhaust-gas recirculation line branches off from the longer feed line, with the feed lines (4, 5) having different cross sections, the feed line (4) with the larger cross section being arranged ahead of the internal combustion engine (1) in the forward direction of travel of the motor vehicle and below the internal combustion engine (1), having an arc-shaped region (6), from which the exhaust line (7) runs counter to the direction of travel to the catalytic converter (8), which is arranged underneath the passenger compartment, the feed line (5) with the smaller cross section providing a short connection between a region (12) of the collecting line (11) and a region (13) of the exhaust line (7) adjacent to the catalytic converter (8).

2. The exhaust system as claimed in claim 1, wherein the internal combustion engine (1), which has in-line cylinders, is arranged transversely to the direction of travel, and the exhaust manifold (2) from the cylinders is located behind the internal combustion engine (1), as seen in the forward direction of travel.

3. The exhaust system as claimed in claim 1, wherein the removal point for the exhaust gas to be recirculated through exhaust gas recirculation line 15 is arranged between the shut-off valve (9) and the catalytic converter.

4. The exhaust system as claimed in claim 1, wherein the shut-off valve (9) is arranged in bend (6) in feed line (4).

5. The exhaust system as claimed in claim 1, wherein a proportional valve is arranged in the exhaust-gas recirculation line (15).

* * * * *